March 30, 1954 K. R. THOMPSON 2,673,462
TUBE LEAKAGE TESTING MACHINE
Filed April 19, 1949 3 Sheets-Sheet 1
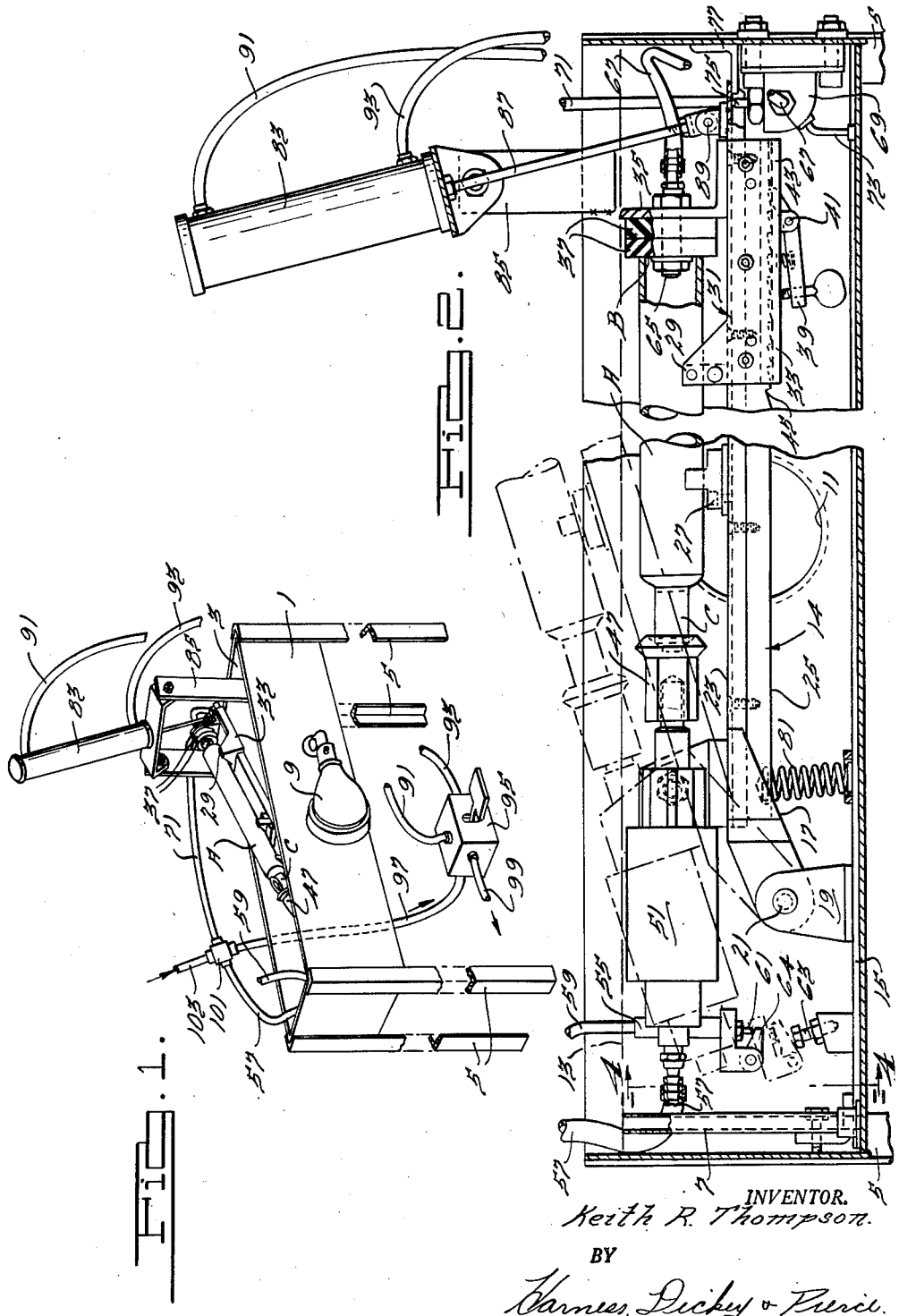
INVENTOR.
Keith R. Thompson.
BY
Barnes, Dickey & Pierce.
ATTORNEYS.

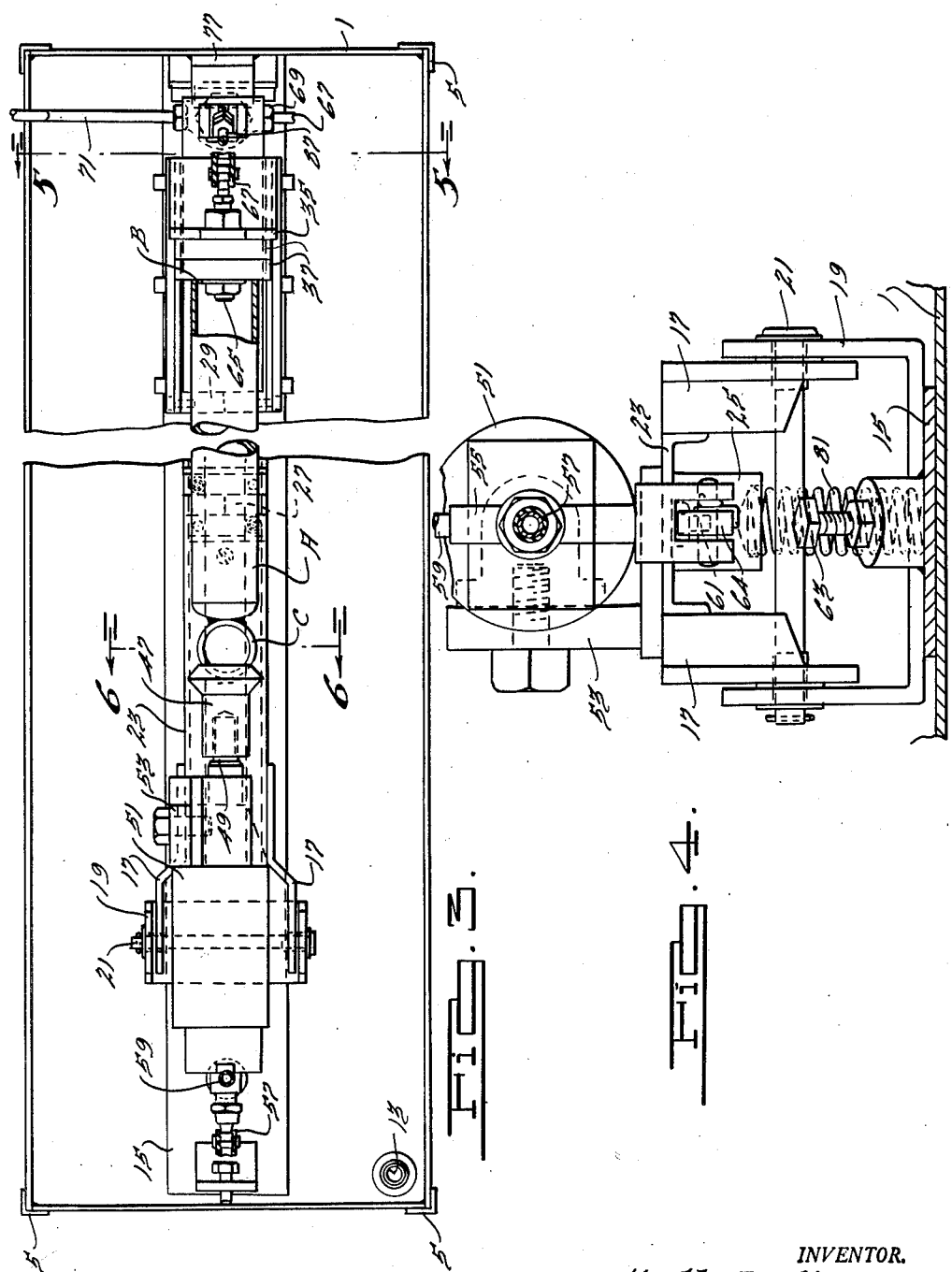

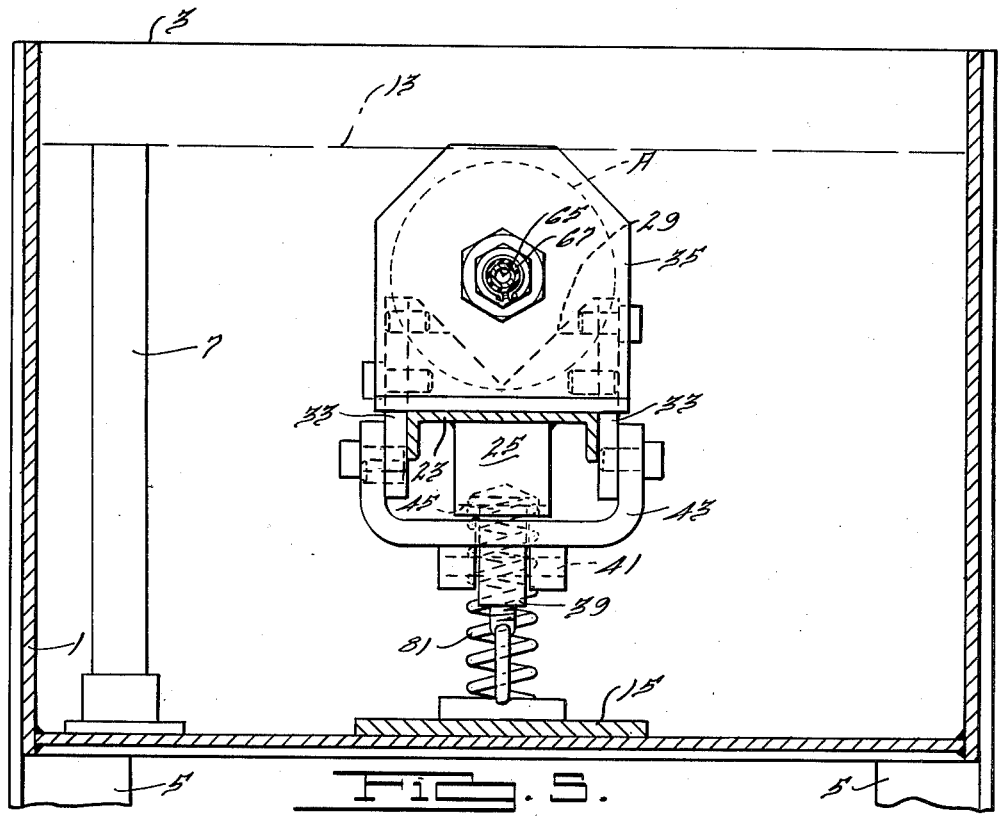

Patented Mar. 30, 1954

2,673,462

UNITED STATES PATENT OFFICE 2,673,462

TUBE LEAKAGE TESTING MACHINE

Keith R. Thompson, Monroe, Mich., assignor to Monroe Auto Equipment Company, Monroe, Mich., a corporation of Michigan Application April 19, 1949, Serial No. 88,250

3 Claims. (Cl. 73—40)

This invention relates to devices that test for leakage of tubes or other hollow parts.

It is an object of the invention to provide a tube leakage testing device that requires a minimum of human skill to operate.

Another object is to provide such a device that may be easily and rapidly operated.

A further object is to provide a device in which optimum conditions are present for the observation of the escape of fluid pressure from a tube being tested.

An additional object is to provide such a device in which the testing bath is not appreciably disturbed by the escape of pressure fluid during loading and unloading operations.

Other objects of the invention will appear in the detailed description to follow. Generally, the improved tube leakage tester comprises a cradle for the tube which is lowered into or raised out of the testing bath by means of a pressure cylinder. The cradle includes means that are also pressure actuated for sealing the open ends of the tubes being tested. The cradle cylinder is controlled by a valve which is actuated by the operator. Movement of the cradle actuates a second valve to control the second pressure cylinder and seal the tube. Further movement of the cradle actuates a third valve to admit pressure fluid to the tube. Upon the operator's release of the first valve, the cradle cylinder lifts the cradle out of the bath and during this movement the third and then the second valves are opened to exhaust the tube and then unseal it so that the operator can remove it and load another on the cradle.

A preferred embodiment of the invention is shown by way of illustration in the accompanying drawings in which:

Figure 1 is a perspective view of the improved tube leakage testing device;

Fig. 2 is a longitudinal section taken just inside the tank of Fig. 1 and shows the cradle mechanism in side elevation;

Fig. 3 is a plan view of the device;

Fig. 4 is a cross section taken on line 4—4 of Fig. 2;

Fig. 5 is a cross section taken on line 5—5 of Fig. 3; and

Fig. 6 is a cross section taken on line 6—6 of Fig. 3.

Any suitable means for providing a testing bath may be utilized in conjunction with the present invention. A preferred form is shown in Fig. 1 as comprising a rectangular tank 1 having an open top 3 and corner legs 5 that support it at a convenient height above the floor. Water may be fed into the tank 1 and maintained at a desired level through the medium of a standpipe 7 (Fig. 2). A light 9 may be employed to shine through a suitable sealed aperture 11 in a side of the tank to illuminate the interior and facilitate the detection of air bubbles escaping from tubes being tested in the bath, the level of the bath being indicated at 13.

The fixture or cradle 14 for holding tubes to be tested may be mounted upon a plate 15 that rests on the bottom of tank 1 as shown or may be attached to the bottom of the tank. The cradle 14 includes short longitudinal side legs 17 that are pivoted at one end to a bracket 19 that is mounted on the plate 15, as shown at 21. The legs 17 are welded to the flanges of a channel beam 23 which forms the major member of the cradle 14. The web of the channel 23 may have a rib 25 suitably affixed thereto and extending somewhat below the flanges thereof (Figs. 2 and 5).

The tubes A illustrated are used in shock absorbers and have an opening B at one end and a looped cap or closure C at the other. The cap C is welded to the tube A and the test provided by the present device is intended primarily to determine the quality of this weld. The tube is supported on the cradle 14 by a V block 27 that is fixed to the web of the channel 23 and by a V block 29 that forms one end of an adjustable support 31. The support includes side legs 33 which are in juxtaposition to the flanges of channel 23 and which interconnect the V block 29 and an upright member 35 that has pads 37 of rubber or other suitable gasket material affixed to its vertical face. The pads 37 are adapted to engage and seal the open end B of a tube A that is supported on the V blocks 27 and 29. The support 31 rests, of course, on the web of the channel 23 by virtue of the block 27 and member 35. It is removably fixed against movement away from block 27 by means of a spring pressed pawl lever 39 that is pivoted at 41 to suitable ears extending from the lower face of a U-shaped bracket 43 that fits beneath the channel 23 and has its flanges secured to the side legs 33 of the support 31. The pawl 39 cooperates with notches 45 in the underface of the rib 25 to prevent slipping of the support 31.

The cap C end of the tube A fits for alignment and support purposes in a suitable recess in an adapter 47. This adapter 47 is carried by the exterior end of a piston rod 49 of a suitable air cylinder 51 which is supported on the cradle 14 in any convenient manner as by an upright bracket 53. The reciprocatory stroke of the piston rod 49 is controlled by a suitable valve 55 which receives pressure air through a conduit 57. In the cylinder 51, shown for purposes of illustration, the piston rod 49 is spring pressed to the left so that the valve 55 by its regulation of air flow to one end of the cylinder controls the position of the piston rod 49 and adapter 47. Thus, in addition to the air inlet line 57, the valve 55 also has an exhaust conduit 59 and the communication of either of these conduits with the cylinder 51 is under the control of the valve plunger 61, this type of valve being a conventional item which may be purchased on the open market. It will be observed that the valve 61 extends beyond the left end of the bracket 19 to which the cradle is pivoted and therefore moves in an opposite direction to a tube A supported on the cradle. It is desired to energize the cylinder 51 so as to drive the adapter 47 to the right and slide the tube A on its supports 27 and 29 against pads 37 and therefore seal the opening B upon downward movement of the cradle 14. To accomplish this the valve 55 is arranged so that the plunger 61 is ordinarily biased to permit communication of the pressure conduit 57 with the cylinder. On the other hand when the cradle is moved upwardly out of the bath it is desired to exhaust air from the cylinder 51 so that the axial force sealing the tube A is released. This is effectuated by upward movement of plunger 61 relative to the valve 55, and is accomplished by a stop 63 of adjustable length that is secured to the plate 15 which limits downward movement of the plunger 61 as the cradle 14 is pivoted up out of the bath. If desired a lever 64 may be inserted between the plunger 61 and stop 63 to engage each.

Means are provided to automatically admit pressure air for testing purposes to the tube A after it has been sealed against the pads 37 and to exhaust such air from the tube after it has been tested and before it is unsealed or released from the pads 37 by de-energization of cylinder 51 as just described. For this purpose the member 35 and pads 37 have a fluid passage 65 which is in alignment with the tube opening B and therefore communicates with the interior of the tube A. A conduit 67 attached to the member 37 in communication with passage 65 provides means for the flow of testing pressure air to and from the tube. Flow through the conduit 67 is under the control of a suitable plunger operated three way valve 69, which may be carried by the tank 1 as shown, procurable on the open market. Air under pressure is admitted to the valve 69 through conduit 71 and air from the tube is exhausted from the valve 69 through a conduit 73 which preferably has its outlet outside the tank as shown so as to prevent agitation of the testing bath due to the release of pressure air from the tube. The valve plunger 75 connects the pressure line 71 to the tube conduit 67 when it is depressed but in its normal biased upward position it connects conduit 67 to the exhaust line 73. The valve 69 is located adjacent a stop and support 77 for the free end of the cradle channel 23 so that the latter depresses the plunger 75 and thereby admits pressure test air to the tube A when it reaches its position of rest in the test bath. When the cradle 14 is pivoted upwardly, the free end or channel 23 releases the plunger 75 so that air in the tube A is exhausted through conduit 73 before the plunger 61 is actuated to initiate unsealing of the tube end B.

The cradle 14 is biased upwardly out of the bath by a compression spring 81 that rests between the web of channel 23 and the plate 15. While the cradle 14 may be manually pivoted, a pressure cylinder 83 is preferably provided for this purpose. This cylinder is suitably mounted on a bracket 85 that may be secured to the sides of the tank 1. The piston rod 87 of the cylinder is pivoted at 89 to the free end of the channel 23. Pressure is admitted to opposite ends of the cylinder 83 by conduits 91 and 93 and these are controlled by a four way foot valve 95 that has a pressure line 97 and an exhaust line 99. The pressure line 97 and the pressure lines 57 and 71 for valves 55 and 69 may be interconnected by a T 101 that receives pressure air from a suitable source through line 103.

In operation the cradle 14 is normally in the dotted line position of Fig. 2 due to the pressure of spring 81 and the arrangement of valve 95 which normally connects conduit 93 to the pressure line 97. The tube A is laid on the V blocks 27 and 29. The valve 95 is actuated by depression of the foot pedal so that line 93 is connected to exhaust line 99 and line 91 to pressure line 97. This forces the rod 87 downwardly and therefore moves the cradle 14 toward the bath. When this movement begins, the plunger 61 of valve 55 is depressed by contact with stop 63 but shortly thereafter it is released to convert the pressure line 57 to the cylinder 51 and therefore drive rod 49 and adapter 47 to the right. This forces the tube A against pads 37 and seals the opening B. When the tube A is completely submerged in the test bath, the channel 23 depresses the plunger 75 and the valve 69 passes pressure air from line 71 to line 67 and thus into the tube A.

After the operator has ascertained by the presence or absence of bubbles escaping from the tube A whether or not it is faulty, he releases the foot valve 95. This connects line 91 of the cylinder 83 to exhaust and the line 93 to pressure line 97 so that the rod 87 lifts the free end of the cradle. As this upward movement begins the plunger 75 is released and the valve 69 connects the line 67 and thus the interior of tube A to line 73 which permits the air to flow directly to the outside of the tank so as not to violently agitate the test bath. After this has taken place, the upward movement of the forward portion of the cradle 14 causes the plunger 61 to move downwardly against the stop 63 to connect the cylinder 51 to the exhaust line 59 and thereby unseal the tube A so that it may be removed from and a new one inserted in the cradle 14.

Various modifications are within the scope of the invention it being especially evident that the device may be employed to submerge more than one tube at a time in the testing bath.

What is claimed is:

1. In a device for testing leakage of tubes having predetermined end openings the combination of means adapted to contain a testing bath, an elongated cradle pivoted adjacent one end for slidably supporting tubes to be tested, means for moving one end of the cradle into and out of the bath, members on the cradle for engaging the ends of a tube supported thereon so that the tube is supported on its side and movable sideways into the bath, one of said members being adapted to seal the end opening in the tube, one of said members being movable lengthwise of the tube, a pressure cylinder on the cradle for moving the movable member against the tube to apply axial force thereto to effectuate sealing engagement of the sealing member with the tube portion surrounding said opening and for moving the movable member away from the tube to effectuate unsealing, a valve controlling the pressure cylinder, said valve being operated by the cradle to seal said end opening when the latter has been lowered to a predetermined position in the bath and to unseal said end opening when the cradle is lifted above such position, and means including a valve for admitting pressure fluid to and exhausting it from the tube through the sealing member and tube opening, said last valve being operated by the cradle to admit air after the tube has been sealed and to exhaust air to atmosphere before the tube has been unsealed and before the cradle is lifted out of the bath.

2. In a hollow part leakage testing device having a tank adapted to contain a testing bath, the combination of an elongated cradle pivoted adjacent one end in the tank whereby the free end of the cradle is movable into and out of the testing bath, means for pivotally moving the cradle, a member carried by the cradle for sealing a predetermined opening in the part to be tested, a fluid passage in said sealing member in alignment with the part opening whereby fluid may communicate with the interior of the hollow part, a source of pressure air, means including a valve connecting said source with said passage, said valve having an exhaust port vented to atmosphere and being normally arranged to connect the passage with the port, said valve being mounted in the tank beneath said cradle and having a control element engaged by the cradle only in its substantially fully lowered position to operate said valve so as to connect the passage with the source.

3. In a hollow part leakage testing device having a tank adapted to contain a testing bath, the combination of an elongated cradle pivoted adjacent one end in the tank whereby the free end of the cradle is movable into and out of the testing bath, means for pivotally moving the cradle, a member carried by the cradle for sealing an opening in one end of the part, a pressure cylinder having a rod movable toward and away from said sealing member, an adapter mounted on the rod for engaging the other end of the part and forcing the part against the sealing member upon movement of the rod, a valve for operating the pressure cylinder and including a control element, means actuated by movement of the cradle for operatively engaging the control element when the cradle is in an intermediate position between its ultimate raised and lowered positions, a fluid passage in said sealing member in alignment with the part opening whereby fluid may communicate with the interior of the hollow part, a source of pressure fluid, means including a valve connecting said source with said passage, said last mentioned valve having an exhaust port and being normally arranged to connect the passage with the port, said last mentioned valve being mounted in the tank beneath said cradle and having a control element engaged by the cradle only in its substantially fully lowered position to operate said valve so as to connect the passage with the source.

KEITH R. THOMPSON.

References Cited in the file of this patent

UNITED STATES PATENTS

| Number | Name | Date |
|---|---|---|
| 1,378,215 | Burns | May 17, 1921 |
| 2,391,351 | Schmidt | Dec. 18, 1945 |
| 2,532,954 | Sherer | Dec. 5, 1950 |